J. R. RICKETTS.
GAS REGULATOR.
APPLICATION FILED AUG. 28, 1912.
1,079,146.
Patented Nov. 18, 1913.
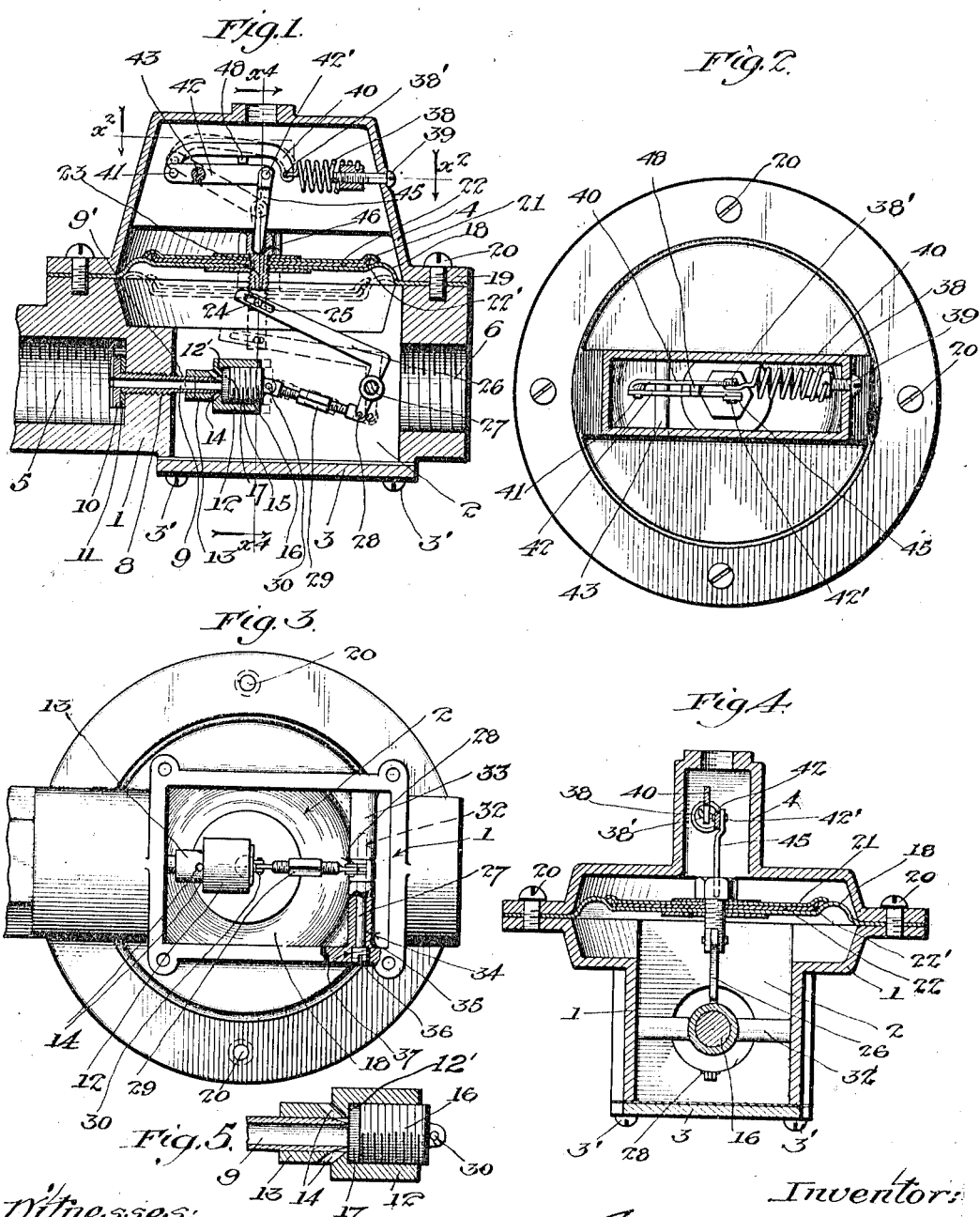

UNITED STATES PATENT OFFICE.

JAMES R. RICKETTS, OF LOS ANGELES, CALIFORNIA, ASSIGNOR TO PERFECTION GAS REGULATOR COMPANY, OF LOS ANGELES, CALIFORNIA, A CORPORATION OF CALIFORNIA.

GAS-REGULATOR.

1,079,146. Specification of Letters Patent. Patented Nov. 18, 1913.

Application filed August 28, 1912. Serial No. 717,618.

*To all whom it may concern:*

Be it known that I, JAMES R. RICKETTS, a citizen of the United States, residing at Los Angeles, in the county of Los Angeles and State of California, have invented a new and useful Gas-Regulator, of which the following is a specification.

This invention relates to means for regulating the pressure of gas or other fluids, and particularly to reducing the pressure from gas mains to domestic service pipes, and the main object of the invention is to provide a device for this purpose which will maintain a steady, equable pressure on the service pipe, irrespective of the amount of gas that is being consumed.

Another object of the invention is to provide a regulator which is applicable both to low and high pressure gases.

A further object of the invention is to provide a gas regulator with a valve having easily removable and renewable parts, so that the valve seating parts can be inspected, cleaned, or renewed when required.

Other objects of the invention will appear hereinafter.

The accompanying drawings illustrate an embodiment of the invention, and referring thereto:

Figure 1 is a vertical section of the regulator. Fig. 2 is a horizontal section on line $x^2$—$x^2$ in Fig. 1. Fig. 3 is an inverted plan view partly broken away, and with the bottom plate removed. Fig. 4 is a vertical section on line $x^4$—$x^4$ in Fig. 1. Fig. 5 is a detail section of the valve parts.

The regulator is provided with a case consisting of a body 1, having a valve chamber 2, a closure or bottom plate 3 for said valve chamber, and a top member 4 forming the diaphragm chamber. The body 1 is provided at opposite ends with an inlet 5 and outlet 6, threaded to receive the delivery and service pipes respectively. Bottom plate 3 is removably attached to the body 1, for example, by means of screws 3' so that by removing said body plate, access may be had to the valve parts. The body 1 is formed coaxially with the inlet 5 with a bore 8, threaded to receive a screw-threaded tube 9, which has an outwardly extending flange 10 at its outer end, seating against a washer 11 which bears against the inner end of the inlet recess 5. The inner end of the tube 9 is tapered to form a knife edge valve seat and said tube projects inwardly from the wall of the valve chamber 2 a sufficient distance to form a guide and support for a sliding valve member 12 which is formed with a tubular shank 13 fitting and sliding on the projecting portion 9' of said tube. Said shank 13 is perforated as shown at 14 for flow of gas therethrough. The valve member 12 is enlarged at its outer end and formed in such enlarged portion with a cylindrical recess 15, screw-threaded to receive a screw plug 16 which screws into said recess and bears against a washer 17 of leather or other suitable material which is adapted to seat against the knife edge seat of the tubular valve member 9. The leather washer 17 is clamped between the screw plug 16 and the shoulder 12' at the inner end of the enlargement in the valve member 12. With this construction the valve washer 17 does not require to fit tightly within the valve member but is held in position by positive clamping means, while at the same time the central portion of the washer is not subjected to any pressure and is retained in its natural condition, so as to operate efficiently in seating against the knife edge seat of the tubular valve member 9.

The diaphragm 18 is secured on top of the casing body 1, being, for example, clamped at its edges between the flange 19 of the top member 4 and the said body, said top member being secured in position by screws 20. Said diaphragm may consist of leather or other suitable material and is provided with a central metallic plate 22, said plate being preferably cupped or provided with a peripheral lip 22' so as to hold oil, and a disk 21 of felt or other porous material being provided over this plate to absorb the oil and feed it by capillary action to the leather diaphragm, thus keeping the latter soft and pliable. To the plate 22 is secured a stem 23, carrying a pin 24, engaging in a slot 25 in one arm of a lever 26 pivoted at 27 in the valve chamber 2, and connected at its other end by pivot 28 to one end of a turnbuckle 29, whose other end is connected at 30 to the screw plug 16 of the movable valve member 12. In order to facilitate the removal of the operating lever 26, the pivot 27 thereof is preferably formed as a pin seated at one end in a recess 32 in a boss 33, extending from one side of the valve chamber 2, and extending through a bore 34 in a boss 35 extending from the other side or wall of said recess, said pin being retained in position by a screw plug 36 which screws into a tapped recess 37 at the outer end of the bore 34.

The diaphragm is pressed downwardly in opposition to the pressure of the gas by the action of a spring 38, connected at one end to an adjusting screw 39, and at the other end to a link or yoke 40 having its farther end pivotally connected at 41 to a lever 42, pivoted at 43 to the top member 4, the farther end of said lever being pivotally connected at 42' to a link or bar 45 whose lower end is seated in a recess or socket 46 on the upper end of the diaphragm stem 23. The yoke 40 is preferably curved so that the pivotal connection 38' and 41 to the spring 38 and lever 42 respectively, may be substantially in alinement with the pivotal center 43 of the lever 42 under certain conditions, as hereinafter specified. A stop lug or projection 48 on link 40 engages lever 42 to limit its movement.

The operation is as follows: When there is no gas being drawn from the outlet pipe 6, the valve is closed and the parts occupy the position shown in full lines in Fig. 1, the diaphragm being in uppermost position and the lever 42 being in such position that the pivots 41, 42 and 42' thereof are substantially in line with the line of pull of the spring 38, so that said spring is substantially on dead center, the stop 48 preventing the lever 42 from passing the dead center. If now a small amount of gas be drawn from the outlet, the diaphragm will move downward to a slight extent and the lever 42 will move a little way off of dead center, so that the spring 38 will exercise a light pressure on the diaphragm tending to push it downward and through the connections 42 and 29 to open the valve, and as more gas is drawn from the outlet, by reason of more lights being lighted, for example, the pressure within the valve chamber 2 correspondingly decreases and the diaphragm descends farther and in this movement the lever 42 passes farther from the dead center and the leverage of the spring on the diaphragm is increased. By this means I provide for extreme sensitiveness or delicacy of operation of the diaphragm when but little gas is being used, and a gradual increase in the effect of the spring as the consumption of gas increases. In gas regulators in which the spring is connected to the diaphragm in such manner that the leverage remains substantially constant, the action of the spring is strongest when the diaphragm is fully expanded and but little gas is being used, so that the spring in such case is not sufficiently sensitive to maintain steady pressure on turning on or off one or more additional lights, even although it works satisfactorily when the consumption of gas is large, as the fluctuations in supply are then small relatively to the total consumption. By providing a spring connection which increases the sensitiveness of the spring as the consumption diminishes, I maintain uniform steady control throughout the range of regulation. Moreover, under heavy consumption of gas, the effect of this connection between the resisting spring and the diaphragm is to increase the action of the spring on the diaphragm, so as to enforce the opening of the valve and insure that abundant supply of gas will be maintained. I have found that by using this connection, the capacity of the regulator with the same size orifice, is greatly increased.

In case it is desired to inspect, clean or renew the valve parts, it is only necessary to remove the bottom plate 3, screw the turnbuckle 29, slip the valve member 12 off of the stem 9' of the tube 9 and unscrew the plug 16 from the valve member 12, thus leaving all the valve parts exposed, and when the proper alterations have been made, the parts will be as readily replaced.

What I claim is:

1. In a gas regulator in combination with a valve chamber, a regulating valve and a diaphragm connected to operate said valve responsively to the pressure in said valve chamber, of means for resisting the movement of said diaphragm comprising a spring, a lever having a connection with said diaphragm and a member connected with said spring and pivotally connected to said lever, the line of action of said spring being substantially on a dead center with relation to the pivotal support and connections of said lever when the valve is closed.

2. In a gas regulator, a leather diaphragm, a metallic plate over the diaphragm, having a peripheral lip for retaining oil, and an abutment disk extending over and in contact with said plate and diaphragm to feed oil to the diaphragm.

In testimony whereof, I have hereunto set my hand at Los Angeles, California, this 23rd day of August, 1912.

JAMES R. RICKETTS.

In presence of—
ARTHUR P. KNIGHT,
MARTHA M. LANGE.